United States Patent
Kim et al.

(10) Patent No.: US 8,201,250 B2
(45) Date of Patent: Jun. 12, 2012

(54) SYSTEM AND METHOD FOR CONTROLLING ABNORMAL TRAFFIC BASED ON FUZZY LOGIC

(75) Inventors: Jae Kwang Kim, Gyeonggi-do (KR); Jee Hyong Lee, Seoul (KR); Dong Hoon Lee, Gyeonggi-do (KR); Je Hee Jung, Gyeonggi-do (KR); Tae Bok Yoon, Gyeonggi-do (KR)

(73) Assignee: Sungkyunkwan University Foundation for Corporate Collaboration, Suwon-si, Gyeonggi-do (KR)

( * ) Notice: Subject to any disclaimer, the term of this patent is extended or adjusted under 35 U.S.C. 154(b) by 845 days.

(21) Appl. No.: 12/034,580

(22) Filed: Feb. 20, 2008

(65) Prior Publication Data

US 2009/0187989 A1 Jul. 23, 2009

(30) Foreign Application Priority Data

Jan. 22, 2008 (KR) .................. 10-2008-0006684

(51) Int. Cl.
*G06F 11/00* (2006.01)
(52) U.S. Cl. ............................................. 726/23; 706/1
(58) Field of Classification Search .................. 726/23; 706/1
See application file for complete search history.

(56) References Cited

U.S. PATENT DOCUMENTS

| | | | | |
|---|---|---|---|---|
| 5,229,559 A * | 7/1993 | Siikonen et al. | ............. | 187/391 |
| 7,234,168 B2 * | 6/2007 | Gupta et al. | .................... | 726/25 |
| 7,877,806 B2 * | 1/2011 | Repasi et al. | .................. | 726/23 |
| 2002/0008637 A1 * | 1/2002 | Lemelson et al. | ........... | 340/907 |
| 2003/0014665 A1 * | 1/2003 | Anderson et al. | ............ | 713/201 |
| 2004/0250124 A1 * | 12/2004 | Chesla et al. | ................. | 713/201 |
| 2005/0021740 A1 * | 1/2005 | Bar et al. | ...................... | 709/224 |
| 2006/0137009 A1 * | 6/2006 | Chesla | ............................ | 726/22 |
| 2008/0086434 A1 * | 4/2008 | Chesla | ............................ | 706/12 |

* cited by examiner

*Primary Examiner* — Nabil El Hady
(74) *Attorney, Agent, or Firm* — Blakely, Sokoloff, Taylor & Zafman LLP.

(57) ABSTRACT

A system for controlling abnormal traffic based on a fuzzy logic includes: an intrusion detection module for analyzing packets incoming from a network interface by means of a membership function defined based on a specific period of time, and outputting a fuzzy value representing a degree of a port scan attack; a fuzzy control module for recognizing the degree of the port scan attack based on the fuzzy value and outputting a control signal for traffic control according to the recognized degree of the port scan attack; and an intrusion blocking module for receiving the control signal and controlling the traffic with the network interface.

10 Claims, 7 Drawing Sheets

|  | Normal (N) | Normal or Attack (NA) | Attack (A) |
|---|---|---|---|
| Short (S) | 0 | 5 | 10 |
| Middle (M) | 0 | 5 | 10 |
| Long (L) | 0 | 5 | 10 |

SYSTEM AND METHOD FOR CONTROLLING ABNORMAL TRAFFIC BASED ON FUZZY LOGIC

CROSS-REFERENCE TO RELATED APPLICATIONS

The present patent application claims priority from Korean Patent Application No. 10-2008-0006684 filed on Jan. 22, 2008.

TECHNICAL FIELD

The present invention relates to a system and a method for controlling abnormal traffic. More particularly, the present invention relates to a system and a method for controlling abnormal traffic, in which a hierarchical fuzzy logic technique is applied to a slow port scan attack, so as to detect and cope with the attack.

BACKGROUND ART

With the advent of Denial of Service (DoS) attacks in the late 1990s, networks have actually served as not only a foundation of cyber attacks but also a medium for propagation of cyber attacks. As a result, security attacks have significantly increased, and complexity of attacks is also ever-intensifying.

The DoS attack, which is one of the most widely-used hacking techniques, transmits a mass amount of data for obstructing normal services of a target network or system, which rapidly reduces performance of the target network or system, thereby preventing use of services provided from the target network or system. At the initial stage of the DoS attack when there were little Internet users, the mainstream was a one-to-one type attack in which one attacker targets a single system or a single service of one victim.

However, a current mainstream attack is an N-to-one type attack named Distributed Denial of Service (DDoS), in which N unspecified systems target a single network. Such an attack can infect a plurality of unspecified systems through pre-works such as a port scan, and then can try simultaneous attacks by the infected systems. Therefore, the DDoS attack is destructive enough to knock out not only a single system but also an entire network.

In the DDoS attack, the port scan refers to a process of sequentially accessing a server through a network so as to detect vulnerability in security, i.e. a security hole. In other words, a server-grade computer exposed on the Internet operates based on a TCP/IP protocol, and prepares for multiple access windows called "ports" and awaits an access request from users. Then, the port scan sequentially accesses the ports of the server-grade computer and checks the types of application software and Operation System (OS) running within the server, in order to detect any vulnerable port that may serve as an intrusion path, As a result of the port scan, when a security hole is detected, an unauthorized intrusion is made by using an intrusion program.

With the recent gradual increase of the above-mentioned port scan attacks, an Intrusion Detection System (IDS) for detecting an abnormal harmful traffic and an Intrusion Prevention System (IPS) for detecting and blocking an abnormal harmful traffic, etc., have been proposed so as to protect important systems, and have been effectively blocking the above-described port scan attacks.

However, it is difficult for the conventional IDSs and IPSs to detect and block slow port scan attacks known as a kind of a stealth scan attack. That is, the conventional IDSs and IPSs can detect a general scan attack by using log file or packet analysis, but it is difficult for IDSs and IPSs to discriminate a normal traffic from a slow port scan attack. Furthermore, in the case of strictly applying the pattern, the conventional IDSs and IPSs may cause a serious side effect of misjudging a normal traffic as abnormal traffic and blocking the normal traffic.

DISCLOSURE

Technical Problem

Accordingly, the present invention has been made to solve at least the above-mentioned problems occurring in the prior art, and the present invention provides a system and a method for controlling abnormal traffic, which can detect a slow port scan attack by using a hierarchical fuzzy logic technique, and can cope with the attack through traffic control based on the detected information.

Technical Solution

In accordance with another aspect of the present invention, there is provided a system for controlling abnormal traffic based on a fuzzy logic, the system including: an intrusion detection module for analyzing packets incoming from a network interface by means of a membership function defined based on a specific period of time, and outputting a fuzzy value representing a degree of a port scan attacks a fuzzy control module for recognizing the degree of the port scan attack based on the fuzzy value and outputting a control signal for traffic control according to the recognized degree of the port scan attack; and an intrusion blocking module for receiving the control signal and controlling the traffic with the network interface.

Preferably, the intrusion detection module measures an amount of packets incoming from the network interface during the specific period of time, and outputs the fuzzy value defining the degree of the port scan attack corresponding to the measured amount of the packets.

Preferably, the intrusion blocking module adjusts a bandwidth according to the control signal, so as to block or reduce the traffic with the network interface.

In accordance with another aspect of the present invention, there is provided a system for controlling abnormal traffic based on a fuzzy logic, the system including: an intrusion detection module for analyzing packets incoming from a network interface by a plurality of membership functions defined based on different periods of time, and outputting fuzzy values representing a degree of a port scan attack; a fuzzy control module for recognizing the degree of the port scan attack based on the fuzzy values and outputting a control signal for traffic control according to the recognized degree of the port scan attack and an intrusion blocking module for controlling traffic with the network interface according to the control signal.

Preferably, the intrusion detection module applies the membership functions based on a hierarchical structure according to different lengths of time, and outputs a plurality of fuzzy values yielded from the membership functions.

Preferably, the plurality of membership functions measure an amount of packets incoming from the network interface during each period of time, and yield the fuzzy values defining the degree of a port scan attack corresponding to the measured amount of the packets.

Preferably, the fuzzy control module calculates a weight for the degree of a slow port scan attack by combining a plurality of fuzzy values output from the intrusion detection module, and outputs the control signal for the traffic control according to the calculated weight.

Preferably, the intrusion blocking module adjusts a bandwidth according to the control signal, in order to block or reduce traffic with the network interface.

In accordance with another aspect of the present invention, there is provided a method for controlling abnormal traffic based on a fuzzy logic, the method including the steps of: i) receiving packets incoming from a network interface during a specific period of time ii) analyzing the packets through membership functions defined based on the specific period of time and yielding fuzzy values representing a degree of a port scan attack; iii) recognizing the degree of the port scan attack based on the yielded fuzzy values, and outputting a control signal for traffic control according to the recognized degree of the port scan attack; and iv) controlling traffic with the network interface according to the control signal.

Preferably, step ii) includes the steps of: measuring an amount of packets incoming from the network interface during the specific period of time; and outputting the fuzzy values defining the degree of the port scan attack corresponding to the measured amount of the packets.

Preferably, in step iv), the traffic with the network interface is blocked or reduced by adjusting a bandwidth according to the control signal.

In accordance with another aspect of the present invention, there is provided a method for controlling abnormal traffic based on a fuzzy logic, the method including the steps of: a) receiving packets incoming from a network interface; b) analyzing the received packets through a plurality of membership functions defined based on different periods of time and yielding fuzzy values representing a degree of a port scan attack; c) recognizing the degree of the port scan attack based on the yielded fuzzy values, and outputting a control signal for traffic control according to the degree of the port scan attack; and d) controlling traffic with the network interface according to the control signal.

Preferably, in step b), the membership functions are defined based on a hierarchical structure according to different lengths of timer and a plurality of fuzzy values yielded from each of the membership functions are output.

Preferably, step b) includes the steps of: measuring an amount of packets incoming from the network interface during each period of time; and yielding and outputting the plurality of fuzzy values defining the degree of the port scan attack corresponding to the measured amount of the incoming packet.

Preferably, step c) includes the steps of: calculates a weight for the degree of the slow port scan attack by combining the plurality of fuzzy values; and outputting the control signal for traffic control according to the calculated weight.

Preferably, in step d), the traffic with the network interface is blocked or reduced by adjusting a bandwidth according to the control signal.

Advantageous Effects

By a system and a method for controlling abnormal traffic according to the present invention, it is possible by using membership functions based on a hierarchical fuzzy logic, to easily detect a slow port scan attack, known as a kind of stealth scan attack, which it is difficult to detect by a conventional technique. At the same time, in the system and method according to the present invention, fuzzy values are calculated for a normal behavior, an attack behavior, and a middle behavior between the normal behavior and the attack behavior for a detection target, so that it is also possible to deal with the attack through traffic control.

BRIEF DESCRIPTION OF THE DRAWINGS

The foregoing and other objects, features and advantages of the present invention will become more apparent from the following detailed description when taken in conjunction with the accompanying drawings in which:

FIGS. 2 to 4C are views graphically illustrating a membership function according to an embodiment of the present invention.

BEST MODE FOR CARRYING OUT THE INVENTION

Hereinafter, a preferred embodiment of the present invention will be described with reference to the accompanying drawings.

Figure 1:
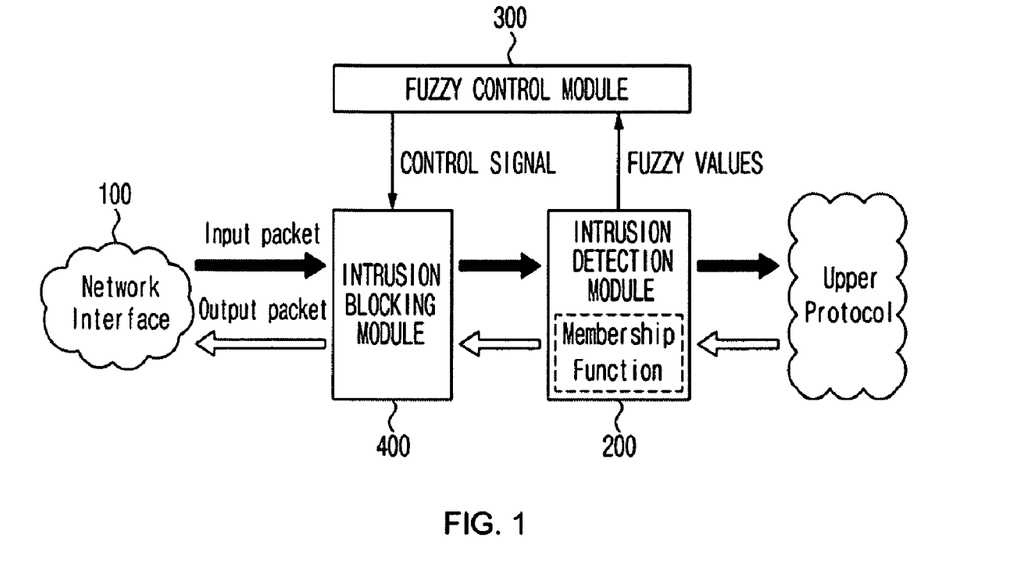
FIG. 1 is a block diagram schematically illustrating the construction of a system for controlling abnormal traffic based on a fuzzy logic according to an embodiment of the present invention.

FIG. 1 is a block diagram schematically illustrating the construction of a system for controlling abnormal traffic based on a fuzzy logic according to an embodiment of the present invention.

As shown in FIG. 1, the system for controlling abnormal traffic includes an intrusion detection module 200 for analyzing a packet incoming through a network interface 100 and outputting a fuzzy value representing the degree of a port scan attack, a fuzzy control module 300 for recognizing the degree of the port scan attack based on the fuzzy value output from the intrusion detection module 200 and then outputting a control signal for traffic control based on the recognized fuzzy value, and an intrusion blocking module 400 for controlling the traffic with the network interface 100 according to the control signal output from the fuzzy control module 300.

The intrusion detection module 200 applies a membership function to packets incoming through the network interface 100, in order to detect a port scan attack (preferably a slow port scan attack, which is a kind of stealth port scan attack) and identify the degree of the port scan attack. Herein, the membership function measures an amount of packets incoming from the network interface 100 during a specific period of time and yields a fuzzy value defining the degree of the slow port scan attack corresponding to the measured amount of the packets. In this case, the degree of the slow port scan attack can be divided into a normal state (N), a middle state (NA) between the normal state and an attack state, and an attack state (A) according to the amount of packets incoming during the specific period of time.

Figure 2:
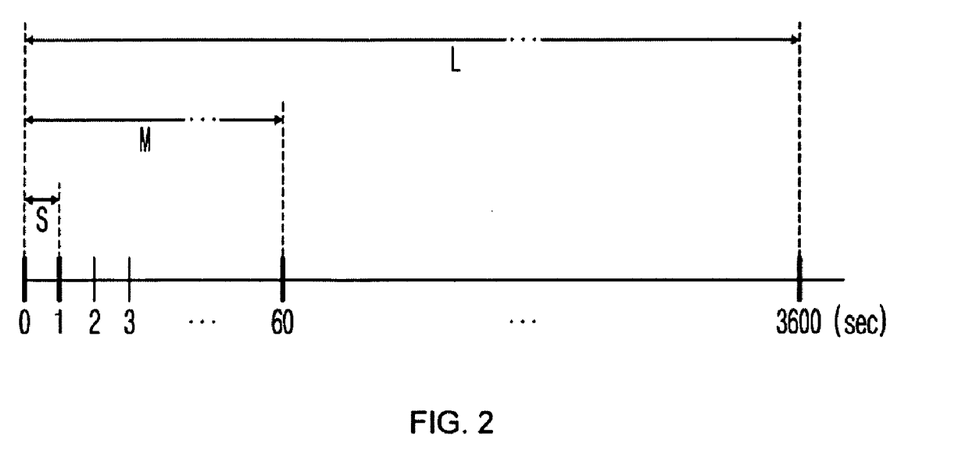
Figure 3:
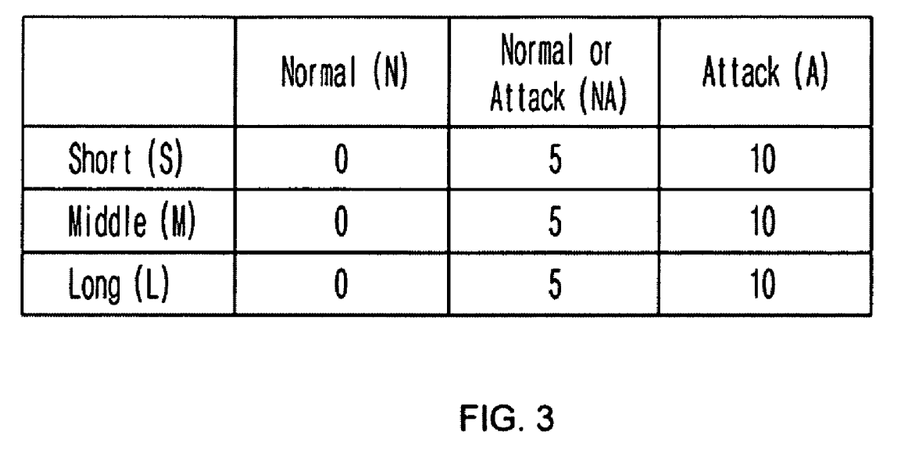
Figure 4A:
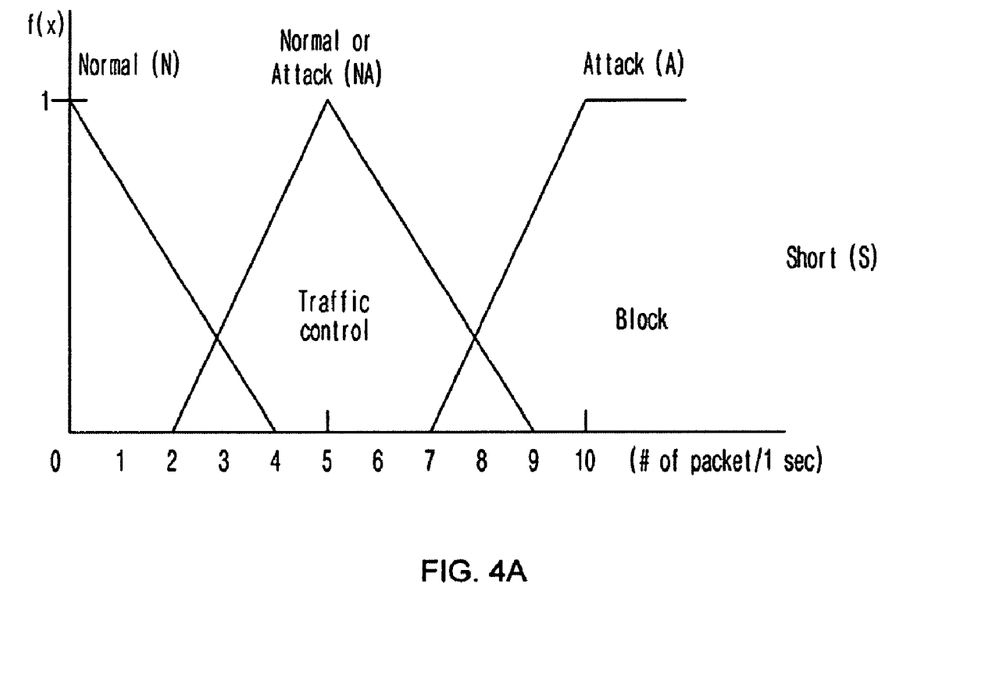
Figure 4B:
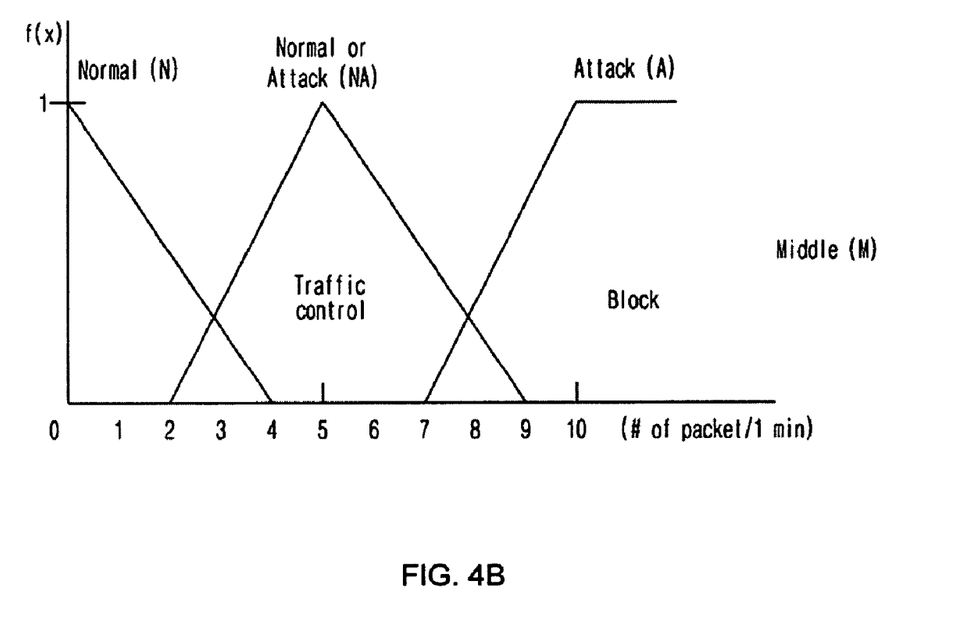
Figure 4C:
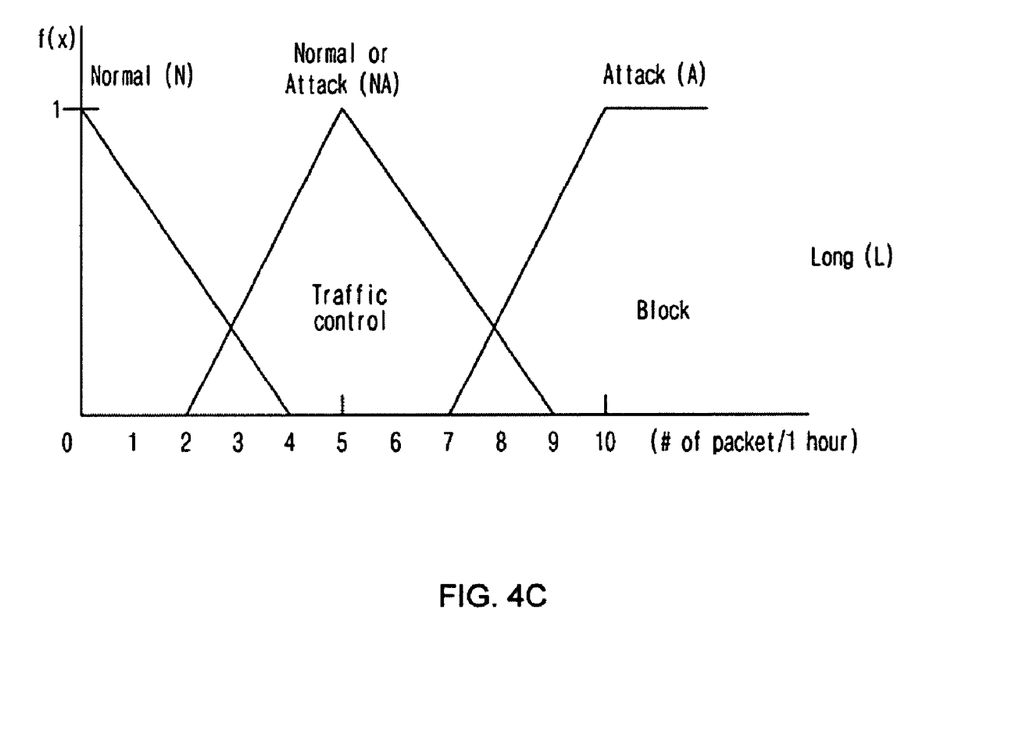

Further, the intrusion detection module 200 analyzes the packets incoming from the network interface 100 by means of a plurality of membership functions defined based on different periods of time, and outputs fuzzy values representing the degree of a slow port scan attack. Specifically, the intrusion detection module 200 applies the membership functions based on a hierarchical structure according to different lengths of time, and then outputs a plurality of fuzzy values yielded from the membership functions. For example, each of the membership functions employed in the intrusion detection module 200 may be defined to have periods of 1 second (Short; S), 60 seconds (Middle; M), and 3600 seconds (Long;

L), as shown in FIG. 2. Also, from the membership functions, degrees of the slow port scan attack according to incoming packets can be defined as shown in FIG. 3. In this case, each membership function can be graphically expressed as shown in FIGS. 4a to 4c.

The fuzzy control module 300 calculates a weight for a degree of slow port scan attack by combining a plurality of fuzzy values output from the intrusion detection module 200, and outputs the control signal for the traffic control according to the calculated weight. For example, the controlling operation of the fuzzy control module 300 will be described with reference to equation (1) below.

if S is N & M is N & L is N, then Q=100% if S is N & M is N & L is NA, then Q=2% if S is N & M is NA & L is N, then Q=2% if S is NA & M is N & L is N, then Q=2% if S is NA & M is NA & L is N, then Q=1% if S is NA & M is N & L is NA, then Q=1% if S is N & M is NA & L is NA, then Q=1% if S is N & M is N & L is A, then Q=B(Block=0%)

if S is N & M is A & L is N, then Q=B if S is A & M is N & L is N, then Q=B if S is A & M is N & L is NA, then Q=B if S is NA & M is N & L is A, then Q=B if S is N & M is NA & L is A, then Q=B if S is N & M is A & L is NA, then Q=B if S is NA & M is A & L is N, then Q=B if S is A & M is NA & L is N, then Q=B if S is A & M is A & L is N, then Q=B if S is A & M is N & L is A, then Q=B if S is N & M is A & L is A, then Q=B if S is A & M is A & L is A, then Q=B    (1)

That is, as expressed in equation 1, the fuzzy control module 300 calculates a weight for the degree of a slow port scan attack by combining a plurality of fuzzy values output from the intrusion detection module 200, and outputs a control signal for adjusting the bandwidth (Q) based on the calculated weight, thereby blocking or reducing the traffic with the network interface 100 either according to the weight for the degree of the slow port scan attack or according to the existence or absence of the slow port scan attack.

In this regard, the intrusion blocking module 400 receives the control signal output from the fuzzy control module 300 and adjusts the bandwidth based on the received control signal, thereby blocking or reducing the traffic with the network interface 100.

Figure 5:
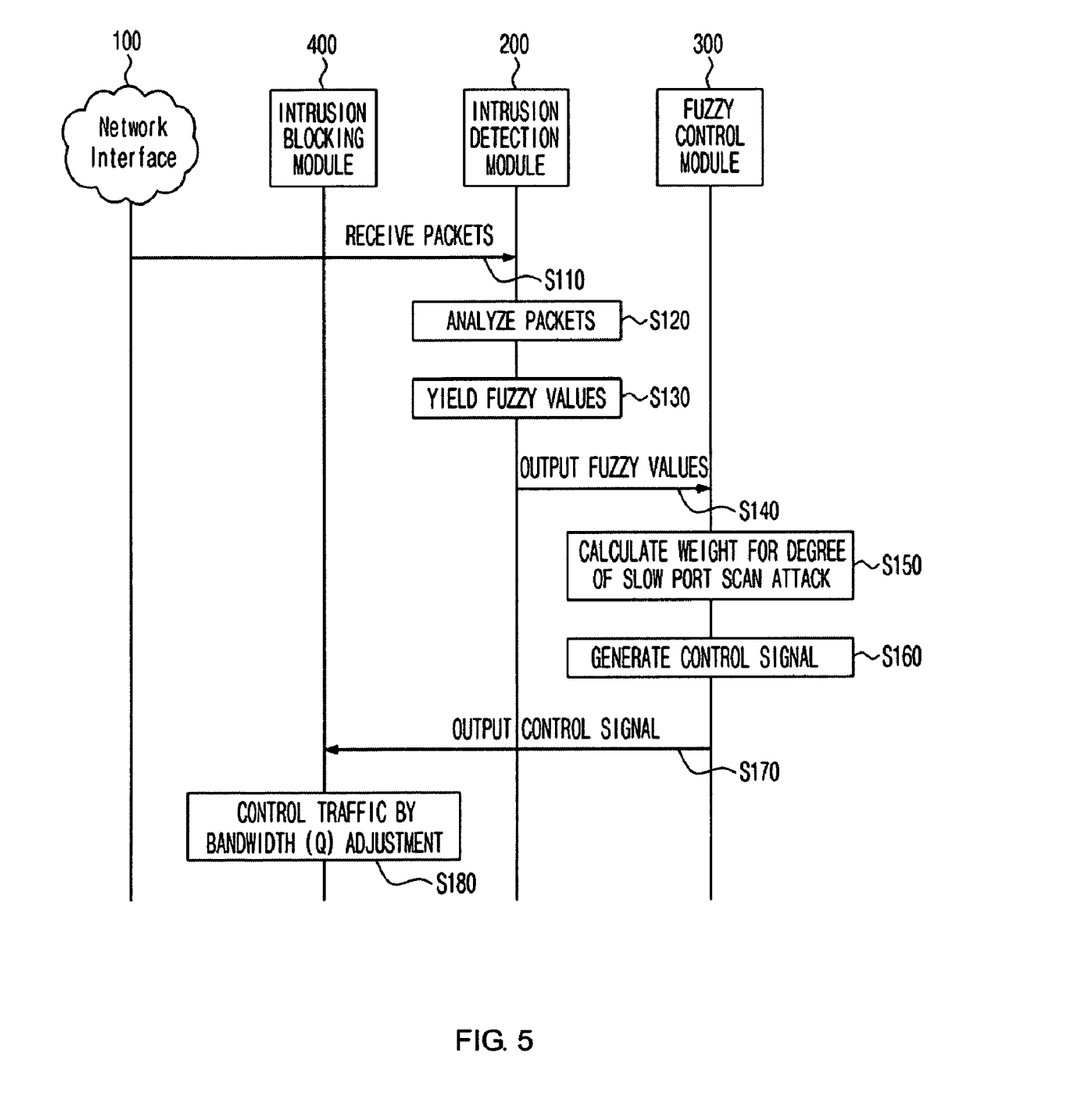
FIG. 5 is a signal flow diagram schematically illustrating a method for controlling abnormal traffic based on a fuzzy logic according to an embodiment of the present invention.

Hereinafter, a method for controlling abnormal traffic based on a fuzzy logic according to an embodiment of the present invention will be described with reference to FIG. 5, which is a signal flow diagram schematically illustrating the method for controlling abnormal traffic based on the fuzzy logic according to an embodiment of the present invention.

First, packets incoming from the network interface 100 are received (step S110). Preferably, the intrusion detection module 200 receives packets that have been filtered through the intrusion blocking module 400.

Then, the incoming packets are analyzed through a plurality of membership functions defined based on different periods of time, and fuzzy values representing the degree of the port scan attack are then output (steps S120 to S140). Preferably, the intrusion detection module 200 analyzes the packets incoming from the network interface 100 by means of a plurality of membership functions defined based on different periods of time, and outputs fuzzy values representing the degree of the slow port scan attack. Specifically, the intrusion detection module 200 applies the membership functions based on a hierarchical structure according to different lengths of time, measures an amount of packets incoming from the network interface during each period of time, and then outputs the fuzzy values defining the degree of the port scan attack corresponding to the measured amount of the packets.

Thereafter, the degree of the port scan attack is recognized based on the output fuzzy values and a control signal for traffic control is output according to the recognized degree of the slow port scan (steps S150 to S170). Preferably, the fuzzy control module 300 calculates a weight for the degree of the slow port scan attack based on a plurality of fuzzy values output from the intrusion detection module 200, and outputs a control signal for adjusting the bandwidth (Q) based on the calculated weight, thereby blocking or reducing the traffic with the network interface 100 either according to the weight for the degree of a slow port scan attack or according to the existence or absence of a slow port scan attack.

Then, the traffic with the network interface is controlled according to the control signal (step S180). Preferably, the intrusion blocking module 400 receives the control signal output from the fuzzy control module 300 and adjusts the bandwidth based on the received control signal, thereby blocking or reducing the traffic with the network interface 100.

INDUSTRIAL APPLICABILITY

A system and a method for controlling abnormal traffic based on a fuzzy logic according to the present invention can cope with a network-based slow port scan attack and thus can greatly reduce an illegal intrusion path. Furthermore, the present invention can effectively cope with a network-based attack, such as a DoS attack. In this regard, the present invention can overcome an existing technical limit. Therefore, the present invention not only has availability in related technical fields and sufficient marketability or transaction possibility, but can also be apparently implemented.

While this invention has been described in connection with what is presently considered to be the most practical and preferred embodiment, it is to be understood that the present invention is not limited to the disclosed embodiment and the drawings, but, on the contrary, it is intended to cover various modifications and variations within the spirit and scope of the appended claims.

What is claimed:

1. A system for controlling abnormal traffic based on a fuzzy logic, the system comprising:
   a computer comprising
      an intrusion detection module to analyze packets incoming from a network interface by a plurality of membership functions, wherein each membership function measures an amount of incoming packets during a period of time, the period of time for each membership function being a different length, and outputting fuzzy values representing a degree of a slow port scan attack;

a fuzzy control module to recognize the degree of the slow port scan attack based on the fuzzy values and output a control signal for traffic control according to the recognized degree of the slow port scan attack; and an intrusion blocking module to control traffic with the network interface according to the control signal.

2. The system as claimed in claim 1, wherein the intrusion detection module applies the membership functions based on a hierarchical structure according to the different lengths of time, and outputs a plurality of fuzzy values yielded from the membership functions.

3. The system as claimed in claim 2, wherein the plurality of membership functions measure an amount of packets incoming from the network interface during each period of time, and yield the fuzzy values defining the degree of a slow port scan attack corresponding to the measured amount of the packets.

4. The system as claimed in claim 3, wherein the fuzzy control module calculates a weight for the degree of a slow port scan attack by combining a plurality of fuzzy values output from the intrusion detection module, and outputs the control signal for the traffic control according to the calculated weight.

5. The system as claimed in claim 4, wherein the intrusion blocking module adjusts a bandwidth according to the control signal, in order to block or reduce traffic with the network interface.

6. A method for controlling abnormal traffic based on a fuzzy logic, the method comprising:

receiving packets incoming from a network interface;

analyzing the received packets through a plurality of membership functions, wherein each membership function measures an amount of incoming packets during period of time, the period of time for each membership function being a different length, and yielding fuzzy values representing a degree of a slow port scan attack;

recognizing the degree of the slow port scan attack based on the yielded fuzzy values, and outputting a control signal for traffic control according to the degree of the slow port scan attack; and controlling traffic with the network interface according to the control signal.

7. The method as claimed in claim 6, wherein the membership functions are defined based on a hierarchical structure according to the different lengths of time, and a plurality of fuzzy values yielded from each of the membership functions are output.

8. The method as claimed in claim 7, wherein analyzing the received packets comprises:

measuring an amount of packets incoming from the network interface during each period of time; and yielding and outputting the plurality of fuzzy values defining the degree of the slow port scan attack corresponding to the measured amount of the incoming packet.

9. The method as claimed in claim 7, wherein recognizing the degree of the slow port scan attack comprises:

calculating a weight for the degree of the slow port scan attack by combining the plurality of fuzzy values; and outputting the control signal for traffic control according to the calculated weight.

10. The method as claimed in claim 6, wherein the traffic with the network interface is blocked or reduced by adjusting a bandwidth according to the control signal.

* * * * *